United States Patent [19]
Shimodaira et al.

[11] Patent Number: 5,178,709
[45] Date of Patent: Jan. 12, 1993

[54] METHOD OF MANUFACTURING A REFLECTOR OF FIBER REINFORCED PLASTIC MATERIAL

[75] Inventors: Hisayo Shimodaira; Toshio Ono, both of Sagamihara, Japan

[73] Assignee: Mitsubishi Denki Kabushiki Kaisha, Tokyo, Japan

[21] Appl. No.: 832,655

[22] Filed: Feb. 11, 1992

Related U.S. Application Data

[60] Continuation of Ser. No. 536,313, Jun. 7, 1990, abandoned, which is a division of Ser. No. 313,317, Jun. 21, 1989, abandoned, which is a continuation of Ser. No. 153,479, Feb. 2, 1988, abandoned, which is a continuation of Ser. No. 852,292, Apr. 15, 1986, abandoned.

[30] Foreign Application Priority Data

| Apr. 15, 1985 | [JP] | Japan | 60-79516 |
| Apr. 15, 1985 | [JP] | Japan | 60-79517 |
| Apr. 15, 1985 | [JP] | Japan | 60-79518 |
| May 9, 1985 | [JP] | Japan | 60-98635 |
| May 9, 1985 | [JP] | Japan | 60-98636 |
| May 9, 1985 | [JP] | Japan | 60-98637 |
| May 9, 1985 | [JP] | Japan | 60-98638 |

[51] Int. Cl.⁵ ............................................. B29C 43/02
[52] U.S. Cl. ................................. 156/242; 343/912
[58] Field of Search ............ 156/242, 245, 150, 151; 343/912

[56] References Cited

U.S. PATENT DOCUMENTS

| 2,747,180 | 5/1956 | Brucker | 156/242 |
| 3,029,433 | 4/1962 | Sokol | 343/912 |
| 3,150,030 | 9/1964 | Mondano | 343/912 |
| 3,169,311 | 2/1965 | Small et al. | 343/912 |
| 3,536,800 | 10/1970 | Hubbard | 343/912 |
| 4,030,953 | 6/1977 | Rutschow et al. | 156/245 |
| 4,115,177 | 9/1978 | Nelson | 156/245 |
| 4,647,329 | 3/1987 | Oono et al. | 156/245 |

Primary Examiner—Caleb Weston
Attorney, Agent, or Firm—Oblon, Spivak, McClelland, Maier & Neustadt

[57] ABSTRACT

A reflector comprises a fiber reinforced plastic plate having a concave shape, a reflecting membrane uniformly formed on the concave surface of the fiber reinforced plastic plate, and a support for anchoring the plate to an immovable.

3 Claims, 5 Drawing Sheets

METHOD OF MANUFACTURING A REFLECTOR OF FIBER REINFORCED PLASTIC MATERIAL

This application is a continuation of application Ser. No. 07/536,313, filed Jun. 7, 1990 abandoned, which is a divisional of Ser. No. 07/313,317, filed Feb. 21, 1989 abandoned, which is a continuation of Ser. No. 07/153,479, filed Feb. 2, 1989, now abandoned, which is a continuation of application Ser. No. 06/852,292 filed Apr. 15, 1986, now abandoned.

BACKGROUND OF THE INVENTION

1. Field of the Invention

The present invention relates to a reflector formed by a fiber reinforced plastic material (hereinbelow referred to as FRP) and a method of manufacturing the same. More particularly, it relates to a reflector formed by FRP which reflects light ranging from infrared rays to visible rays.

2. Description of Prior Art

Figure 1:
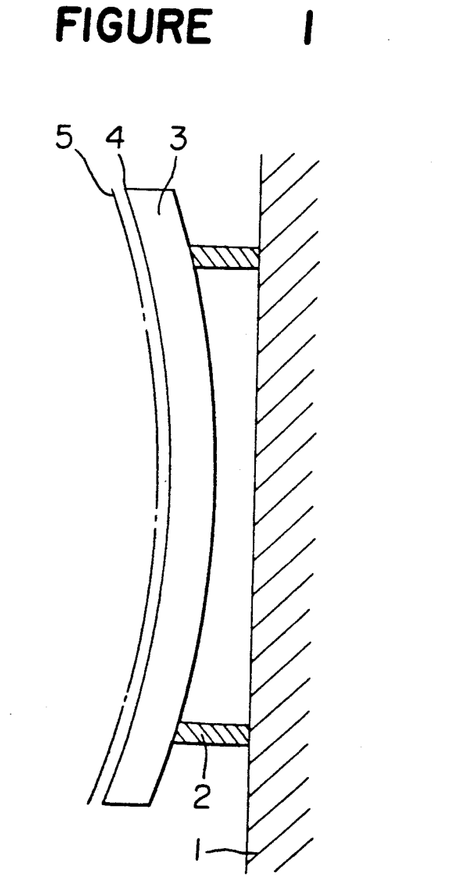
FIGS. 1 and 2 are respectively diagrams partly cross-sectioned of conventional reflectors.
Figure 2:
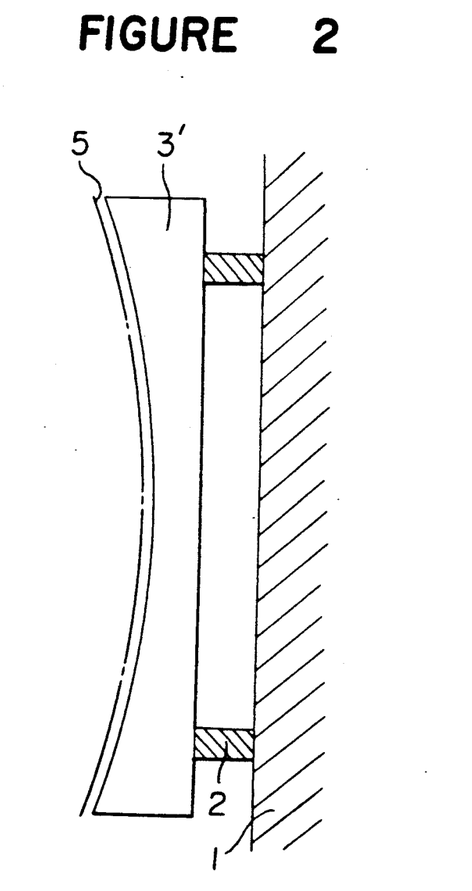

FIGS. 1 and 2 are respectively cross-sectional views of conventional reflectors.

In FIG. 1, a reference nurmeral 1 designates a supporting body made of a material such as metal, a numeral 2 designates a support for a reflector which may be formed by the same material as the supporting body, a numeral 3 designates metal substrate for the reflector of a material such as stainless steel and having a concave surface, a numeral 4 designates a plated layer formed on a surface of the metal substrate 3 and a numeral 5 designates a reflecting membrane such as a vapor-deposited membrane such as aluminum formed on the outer surface of the plated layer 4.

In FIG. 2, a reference numeral 3' designates glass substrate having a small linear expansion coefficient such as Pyrex (Trademark registered by CORNING GLASS WORKS).

In the conventional reflectors having the above-mentioned construction, light in the range from infrared rays to visible rays is reflected by the reflecting membrane 5 which is formed by vapor-deposition on the front surface of the plated layer 4 of the accurately shaped and finely finished reflector.

The conventional reflectors were heavy and difficult in transportation, installation, removal for repairing and so on. Further, it was necessary to increase rigidity by using a strong material such as metal for the supporting body 1 and the support for the reflector 2. This resulted in increase in weight of the supporting body as well as the reflector.

When the reflector is formed by using metal substrate which is normally poor in heat radiation characteristic and has a large linear expansion coefficient, deformation of the reflector takes place due to an increased temperature during a long time operation for reflecting visible rays. This inevitably requires heat control for the reflector.

SUMMARY OF THE INVENTION

It is an object of the present invention to eliminate the disadvantages of the conventional reflectors and to provide a reflector formed by a FRP which is light in weight, has a high rigidity and is thermally stable.

It is another object of the present invention to provide a method of manufacturing a reflector of the FRP having highly accurate dimensions, light weight, high rigidity, being thermally stable and free from the necessity of heat control.

It is still another object of the present invention to provide a method of manufacturing a reflector of FRP in which a complicated grinding step by using a mold release compound is not required to thereby increase efficiency of the manufacturing operation.

It is further object of the present invention to provide a method of manufacturing a reflector of FRP in which a molded reflector substrate is easily removed from a forming mold without using a mold release compound and the surface of the reflector substrate removed from the forming mold can be used as it is, or can be used by forming a vapor-deposition membrane on that surface, as a reflecting surface of the reflector.

The present invention is to provide a reflector which comprises a fiber reinforced plastic plate having a concave shape, a reflecting membrane uniformly formed on the concave surface of the fiber reinforced plastic plate, and a support for anchoring the plate to be immovable part.

Further, the present invention is to provide a method of manufacturing a reflector of fiber reinforced plastic material which comprises a first step of preparing a forming mold made of a material having a small linear expansion coefficient and having a mirror-finished surface required to form a reflector, a second step of vapor-deposition of a metal having a high reflection factor on the surface of the forming mold to form a metallic membrane, a third step of forming a fiber reinforced plastic plate on the vapor-deposited metallic membrane, and a fourth step of heating and compressing a laminated body of the metallic membrane and the plate to form a reflector substrate.

Further, the present invention is to provide a method of manufacturing a reflector of fiber reinforced plastic material which comprises a first step of preparing a forming mold made of a material having a small linear expansion coefficient and having a mirror-finished surface required to form a reflector, a second step of forming on the surface of the forming mold a mold release film having a smooth surface, a third step of placing on the mold release film a fiber reinforced plastic plate in semi-cured condition, a fourth step of heating and compressing a product obtained by the steps to form a reflector substrate, and a fifth step of releasing said reflector substrate from the forming mold followed by vapor-deposition of a metal having a high reflection factor on the surface of the fiber reinforced plastic plate at the side of the mold release film.

DETAILED DESCRIPTION OF PREFERRED EMBODIMENTS

Figure 3:
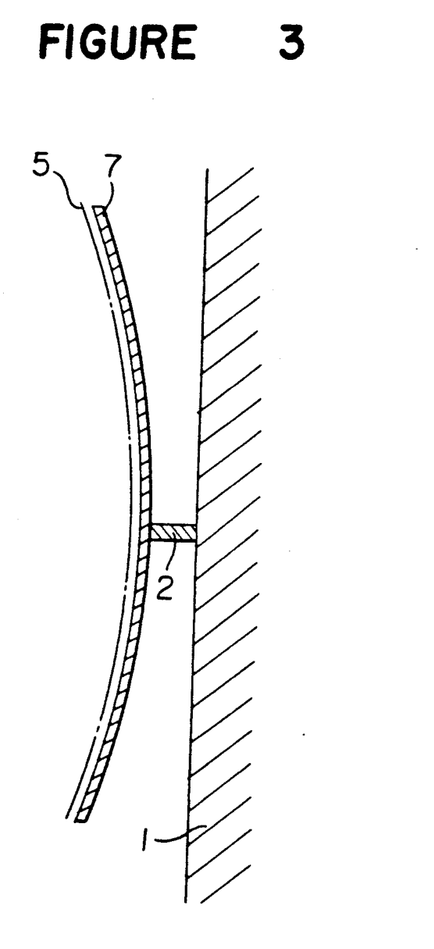
FIG. 3 is a cross-sectional view of a first embodiment of the reflector according to the present invention.

The first embodiment of the present invention will be described with reference to FIG. 3. In FIG. 3, a supporting body 1 as an immovable part is made of a metal frame, and a support 2 for supporting the reflector is made of FRP beams in this embodiment. A reference numeral 7 designates a FRP plate as a substrate for the reflector. In this embodiment, the FRP plate is a carbon fiber reinforced plastic plate which is formed to have concave surface. A reflecting membrane 5 is formed on the front surface of the FRP plate 7. In this embodiment, the reflecting membrane is a vapor-deposited aluminum membrane.

The FRP reflector having the construction as above-mentioned is light in weight and has high rigidity since the FRP plate 7 of the carbon fiber reinforced plastic has a small specific gravity and a high specific rigidity. Further, dimensions of the reflector is stable to change in temperature since the carbon fiber reinforced plastic has a small linear expansion coefficient, whereby there is obtainable a highly accurate reflector. In addition, temperature rise in the reflector is small since the plastic material possesses excellent heat radiation characteristics. In the reflector of the present invention, directivity of reflected light is stable even in the space at a highly reduced presure of $1 \times 10^{-7}$ Torr and a temperature ranging from $-180°$ C. to $+100°$ C.

Although a single FRP plate is used for a reflector substrate in the above-mentioned embodiment, the same effect can be obtained by forming the substrate as follows.

Figure 4:
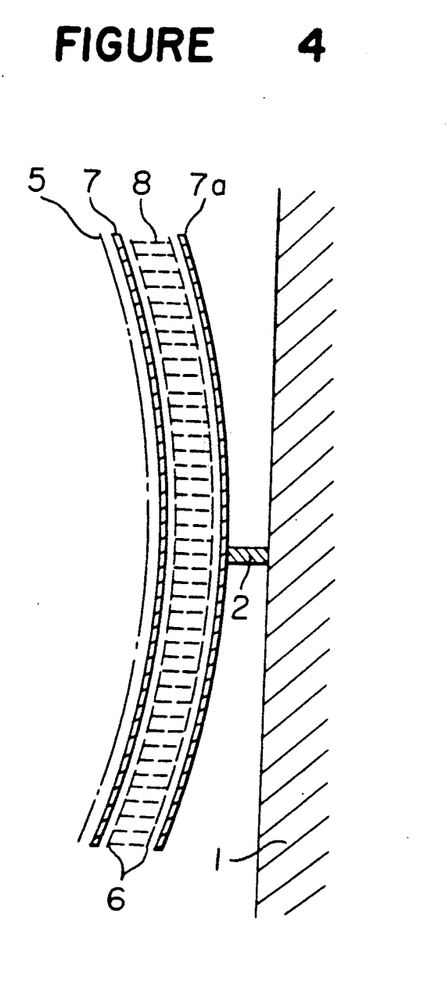
FIG. 4 is a cross-sectional view of a second embodiment of the present invention.

The FRP plates 7, 7a are respectively bonded on the front and rear surfaces of a core material 8 such as a honeycomb core or a polymeric foamed body by an adhesive agent 6, and a reflecting membrane 5 is formed on the front surface of the FRP plate 7 as shown in FIG. 4.

Instead of the vapor-deposited aluminum membrane as the reflecting membrane 5, a vapor-deposited silver membrane, a vapor-deposited aluminum film, or a vapor-deposited silver film may be used.

Figure 5:
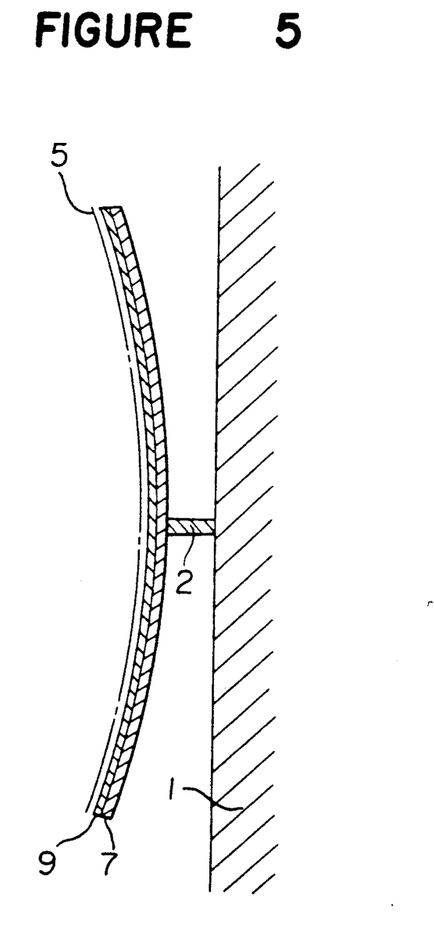
FIG. 5 is a cross-sectional view of a third embodiment of the present invention.
Figure 6:
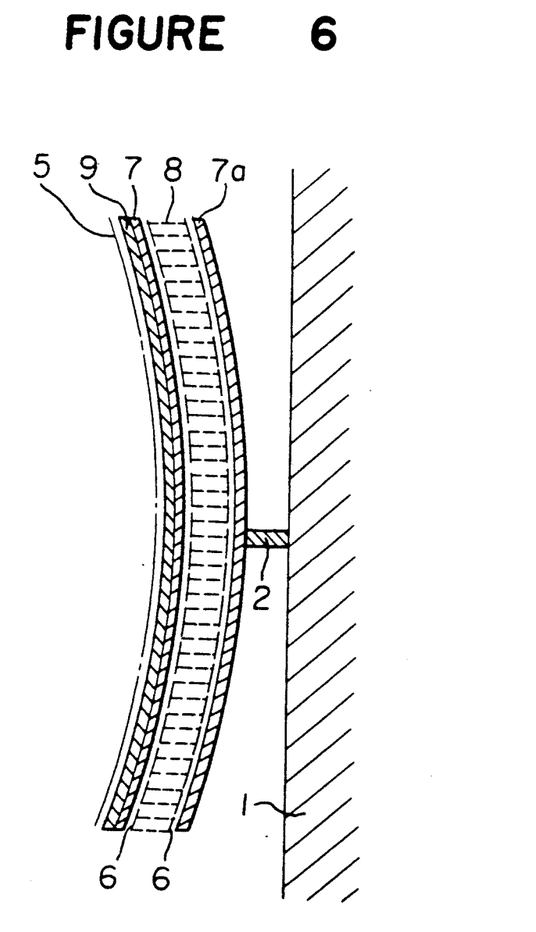
FIG. 6 is a cross-sectional view of a fourth embodiment of the present invention.

FIGS. 5 and 6 respectively show the third and fourth embodiments of the present invention. In the Figures, reference numeral 1 to 8 designate the same or corresponding parts.

A reference numeral 9 designates a hard undercoat layer having a smooth surface. The undercoat layer 9 is a layer formed by impregnating a resinous material in a sheet having a smooth surface followed by curing the resinous material. The sheet is made of fibers having a small linear expansion coefficient, small diameter and short length as similar to that used in the FRP plate 7, the fibers being preferably short alumina fibers. Accordingly, the surface roughness of the sheet itself can be small and the fibers are uniformly distributed in the sheet, whereby cavities does not appear the surface of the sheet even though the linear expansion coefficient of the resin impregnated in the sheet is different from that of the fibers. The hard undercoat layer prevents appearence of the cavities in the FRP plate 7. Accordingly, the reflecting membrane 5 is smooth and therefore, there takes place no deffused reflection of light. The undercoat layer 9 includes the short alumina fibers haing the almost same linear expansion coefficient as the fibers used in the FRP plate 7. Accordingly, difference in the linear expansion coefficient between the FRP plate 7 and the undercoat layer 9 is small, hence cracking and deformation due to temperature change seldon occur. The above-mentioned properties permit formation of a highly accurate reflector.

In the above-mentioned embodiment, description has been made as to the undercoat layer 9 in which a resinous material is impregnated in a sheet having a smooth surface which is made of short alumina fibers.

However, the same effect can be obtained by using another short fiber reinforced plastic sheet of a material such as carbon fibers, or a sheet having a layer of metal such as copper or nickel, or a resin layer.

Figure 7:
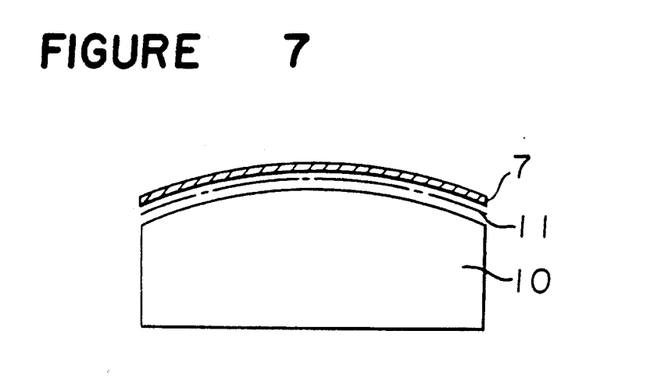
FIG. 7 is a transverse cross-sectional view showing a step of manufacturing the reflector according to the present invention.
Figure 8:
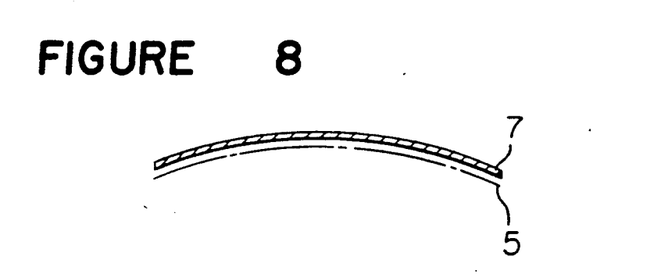
FIG. 8 is a transverse cross-sectional view of a reflector of FRP when it is removed from a forming mold.
Figure 9:
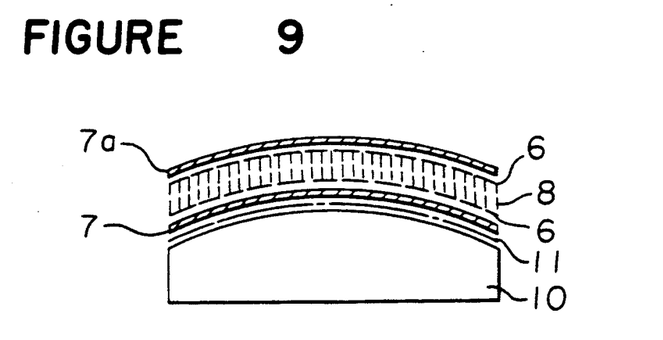
FIG. 9 is a transverse cross-sectional view showing a state of a reflector substrate placed on a forming mold.

FIGS. 7 to 9 respectively show embodiments of the method of manufacturing reflectors as shown in FIGS. 3 and 4.

In the Figures, a reference numeral 10 designates a forming mold made of a material having a small linear expansion coefficient by which a reflector having an accurate shape and dimensions can be obtained. The material for the forming mold is a glass having a heat resistance such as Pyrex (tradename of a product manufactured by CORNING GLASS WORKS). A reference numeral 11 designates a vapor-deposited layer formed on the forming mold 10, the vapor-deposited layer being a layer such as aluminum. The FRP plate 7 constituting an upper layer is formed on the vapor-deposited layer by carbon fiber reinforced plastic in this embodiment.

In this embodiment, the reflector is formed in such a manner that the vapor-deposited membrane 11 is formed by direct deposition of a metal on the forming mold 10 without using a mold release compound; the FRP plate 7 impregnated with a resinous material is placed on the membrane 11 in a semi-cured state, followed by heating and compressing to effect curing of the plate 7. Then, the membrane 11 is bonded to the laminated FRP plate by the aid of the impregnated resin. In addition, peeling-off of the FRP plate 7 and the vapor-deposited membrane 11 is not caused because the forming mold 10 has a small linear expansion coefficient, and the reflecting membrance 5 is formed by transferring the smooth surface of the forming mold to the front surface of the molded product. The molded product can be easily removed from the forming mold 10 because a contacting force of the vapor-deposited membrane 11 to the mold 10 is weak, whereby a highly accurate reflector can be obtained.

Although the reflector formed by a single FRP plate is used for the above-mentioned embodiment, the highly accurate reflector can be obtained even in a case that a molded product having a sandwiched structure as shown in FIG. 9 is formed. In this case, the FRP plate 7 and the other FRP plate 7a are respectively bonded on the front and rear surfaces of the core material 8 made of the honeycomb core or the polymeric foamed body by means of the adhesive agent 6 after the FRP plate 7 is cured.

In accordance with the above-mentioned embodiments, a metal is firstly vapor-deposited on the forming mold, and the FRP plate formed by impregnating the resin is placed on the vapor-deposited layer in a semi-cured state followed by application of heat to cure it. Accordingly, there is obtainable a highly accurate reflector formed by the FRP is obtainable, which unnecessitate a grinding operation and does not cause diffused reflection of light. Further, the manufacturing cost can be reduced since the number of the steps of manufacture of the reflector can be reduced and the forming mold can be repeatedly used.

Figure 10:
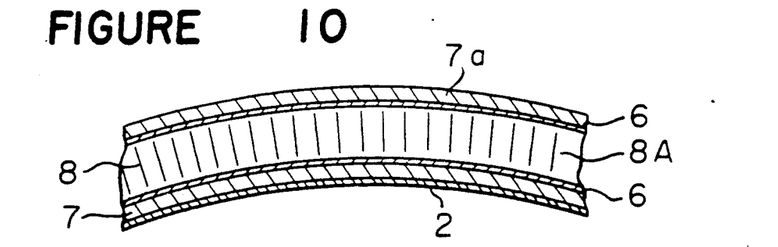
FIGS. 10 and 11 show another embodiment of the method of manufacturing the reflector shown in FIG. 6.
Figure 11:
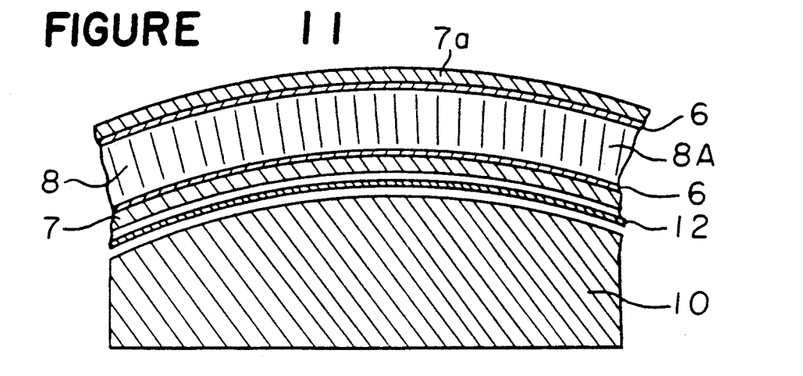

FIGS. 10 and 11 show another embodiment of the method of manufacturing the reflector shown in FIG. 6. In the Figures, the forming mold 10 is made of a material having a small linear expansion coefficient such as glass, and the upper surface of the forming mold is mirror-finished to have accuracy in shape and dimensions as a reflector. Preferably, the forming mold is finished to have a surface roughness of 0.05 μm or smaller. A reference numeral 12 designates a film placed on the upper surface of the forming mold 10, which has a smooth surface and is made of a high molecular material such as polyimide. On a surface of the film, a metallic layer having a high reflection factor such as aluminum layer is formed by vapor deposition.

The reflector having the above-mentioned construction is manufactured as follows.

The film 12 placed on the upper surface of the forming mold 10 mirror-finished. Then, a first FRP plate 7, a core material 8A and a second FRP plate 7a are sequentially piled up in this order by interposing a film-like adhesive agent 6. The piled-up body is subjected to heat and a pressure. Then, the mirror-finished surface of the forming mold 10 is transferred to the FRP plate 7 which is in contact with the forming mold 10 through the film 12, and the metallic layer 15 having a high reflection factor which is vapor-deposited on the film 12 is attached to the surface of the FRP plate 7 to thereby provide a reflecting surface. In this case, the FRP plate 7 placed on the forming mold 10 does not directly contact with the forming mold 10 since the film 12 is interposing between the FRP plate 7 and the foaming mold 10. Accordingly, the FRP plate 7 is not bonded to the forming mold 10, and the plate can be easily removed from the mold without using the mold release compound. A complete reflecting surface is formed at the same time when the FRP plate 7 is removed from the mold 10. Accordingly, the FRP plate having the complete reflecting surface can be attached to a fitting frame (not shown). In the embodiment of manufacturing the reflector, the manufacturing time for the reflector can be reduced. Further, by using a carbon fiber reinforced plastic plate (a CFRP plate) as the reflector substrate, change in shape and dimensions of the reflector can be small even when the temperature changes. Further, distortion of the reflector can be minimized.

In the above-mentioned embodiment, description has been made as to a method of manufacturing the reflector having a sandwiched structure in which the FRP plates are bonded to both sides of the core member made of a light core material such as a thin metal plate or a thin polymeric material, or the polymeric foamed body. However, it is possible to use a single FRP plate 7 in semi-cured state as a reflector substrate. However, another method of manufacturing the reflector can be employed. Namely, the film 12 is placed on the upper surface of the forming mold 10 which has dimensions desired for the reflector, the upper surface of the forming mold being mirror-finished to have a surface roughness of, for instance, 0.05 μm or smaller, and the FRP plate 7 in a semi-cured state is placed on the film 12 instead of the above-mentioned sandwiched body, followed by heating and compressing. Then, the mirror surface of the forming mold 10 is transferred to the FRP plate 7 and the metallic layer 5 having a high reflection factor on the film 12 is deposited onto the transferred surface of the FRP plate 7. Accordingly, the reflecting surface is formed at the same time of removing the FRP plate from the mold 10. The FRP plate 7 can be immediately attached to the frame (not shown). Thus, working time for the reflector can be shortened.

In the above-mentioned embodiment, the metallic layer 5 such as an aluminum layer is previously formed on the film 12 by vapor-deposition. However, the following method can be employed: a film 12 without a metallic layer is used; after heating and compressing of the FRP plate 7 and the film 12 in the forming mold 10, the FRP plate 7 having the transferred mirror-surface is removed from the forming mold 10; and the FRP plate 7 is subjected to vapor-deposition of a metal 5 having a high reflection factor such as aluminum to thereby form the reflecting surface.

In any case, the above-mentioned embodiments employ the steps of overlapping the fiber reinforced plastic plate in a semi-cured state on the film of a polymeric material having a smooth surface, followed by heating and compressing. Accordingly, in the molding operation, the mirror surface of the forming mold having a small linear expansion coefficient is transferred to the FRP plate whereby the undercoat layer of a highly accurate reflecting surface is formed in the FRP plate. Use of the smooth film unnecessitates use of the mold release compound. Further, being the smooth film sticked to the mold the highly accurate undercoat layer for the reflecting surface unnecessitates grinding operation which makes the surface of the FRP plate to be rough. The process of vapor-deposition of a metal having a high reflection factor on the undercoat layer reduces working time. Further, the FRP plate reduces change in shape and dimensions of the reflecting surface due to change in temperature. Accordingly, the reflector free from the distortion can be manufactured.

For the film, a non-ferrous metal which is easily separable from the forming mold may be used. Namely, a non-ferrous metal such as copper or nickel is placed on the forming mold, whereupon the FRP plate is placed on the non-ferrous metal. The laminated body is subjected to heating and compressing whereby the non-ferrous metal is transferred onto the FRP plate. Then, a vapor-deposition layer is formed to form a reflecting surface. The FRP plate is prepared by impregnating a resinous material and it is rendered to be a semi-cured state. The non-ferrous metal is firmly attached to the FRP plate by heating and compressing them, and at the same time, mirror surface of the forming mold is transferred to the FRP plate to thereby providing an excellent undercoat layer.

Figure 12:
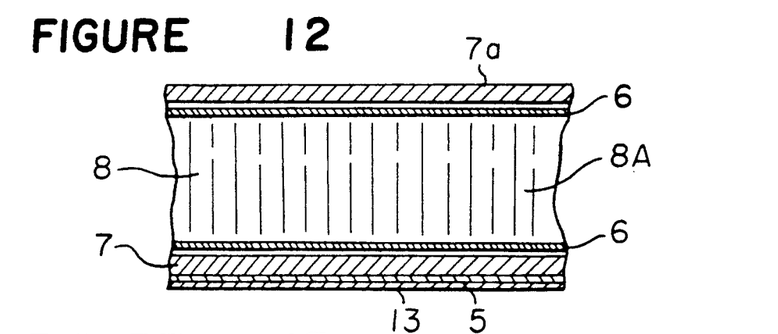
FIGS. 12 and 13 show another embodiment of the method of manufacturing the reflector of the present invention.
Figure 13:
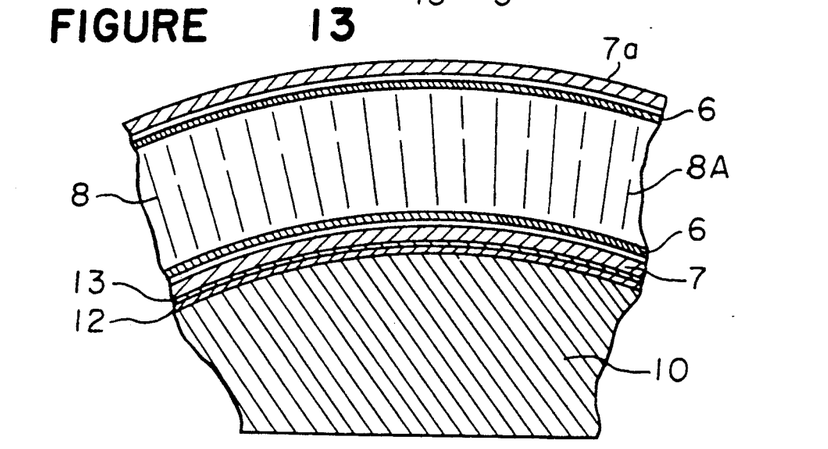

FIGS. 12 and 13 show further embodiment of the method of manufacturing a reflector formed by the FRP according to the present invention.

The forming mold 10 is made of a material having a small linear expansion coefficient such as glass, and the upper surface as a molding surface of the mold 10 is mirror-finished to give accurate dimensions as a reflector, i.e. to give a surface roughness of 0.05 μm or smaller. The mold release film 12 of polyimide is placed on the mirror-finished upper surface of the forming mold 10. A resin layer 13 is formed on the mold release film 12. On the resin layer 13, the FRP plate 7, the adhesive agent 6, the core member 8A, the adhesive agent 6, and the FRP plate 7a are sequentially piled up in this order to form a sandwiched structure 8.

The reflector having the above-mentioned construction may be manufactured as follows.

A reflector substrate is firstly formed as follows. The mold release film 12 is placed on the mirror-finished upper surface of the forming mold 10; the resin layer 13 if formed on the film 12; the FRP plate 17, the adhesive agent 6, the core member 8A, the adhesive agent 6, and the FRP plate 7a are sequentially piled up in this order on the resin layer 13; and thus formed laminated body is heated and compressed whereby the reflector substrate is formed. By removing the reflector substrate from the forming mold, the mirror surface of the mold is transferred to the resin layer 13. Accordingly, the reflecting surface of the reflector is formed by vapor-deposition of aluminum on the resin layer 13. The reflector thus prepared is fixed to a fitting frame (not shown).

A modified embodiment will be described. The mold release film 12 is placed on the mirror-finished surface of the forming mold 10; the resin layer 13 is formed on the film 12; the FRP plate 7 in a semi-cured state is placed on the resin layer 13, instead of putting the sandwiched structure 8; the laminated body is heated and compressed and thereafter the molded product is removed from the mold 10. On the surface of the resin layer 13 having the transferred mirror surface, vapor-deposition of aluminum 5 is carried out. Then, a reflecting surface as the reflector is formed on the surface of the FRP plate. Thus, the reflector is completed by fitting it to the fitting frame (not shown).

In the above-mentioned embodiment of manufacturing the reflector, the forming mold is made of a material having a small linear expansion coefficient and is finished to have a mirror-finished forming surface; the mold release film is placed on the upper surface of the forming mold; the resin layer is formed on the mold release film; the FRP plate in a semi-cured state is placed on the resin layer; and the laminated body is heated and compressed to form the reflector substrate. After the molded product is removed from the forming mold, a thin metallic membrane such as aluminum is formed on the resin layer of the reflector substrate by vapor-deposition to form a reflecting surface. Accrodingly, the reflector indicate small change in dimension to a temperature change because of the FRP plate having a small linear expansion coefficient. The resin layer having the transferred mirror surface on the FRP plate eliminates the grinding operation of the surface. Use of the mold release film instead of the mold release compound permits easy removal of the molded product. The mold relese film does not adhere the resin layer. Accordingly a step of removing the adhered film can be eliminated. Further, adhesion properties of the vapor-deposited aluminum to the resin layer is increased.

What is claimed is:

1. A method of manufacturing a reflector of fiber reinforced plastic material which comprises:
    a first step of preparing a forming mold made of a material having a smaller linear expansion coefficient and having a mirror-finished surface required to form a reflector;
    a second step of vapor-deposition of a metal having a high reflection factor on said surface of the forming mold to form a metallic membrane;
    a third step of forming on said metallic membrane an undercoat layer formed of a short fiber reinforced plastic layer or a resinous layer in which short alumina fibers or short carbon fibers are included;
    a fourth step of forming a fiber reinforced plastic plate on said underlayer; and
    a fifth step of heating and compressing a laminated body of said metallic membrane, said underlayer, and said plastic plate to form a reflector substrate,
    wherein in said fourth step, a first fiber reinforced plastic plate, a light core material of a honeycomb core or a polymeric foamed body and a second fiber reinforced plastic plate are sequentially laminated in this order by interposing an adhesive agent.

2. A method of manufacturing a reflector according to claim 1, wherein in said first step, said mirror-finished surface of the forming mold has a surface roughness of 0.005 μm or smaller.

3. A method of manufacturing a reflector according to claim 1, wherein said second step comprises placing a film of a polymeric material on said surface of the forming mold before vapor-deposition of said metal having a high reflection factor.

* * * * *

UNITED STATES PATENT AND TRADEMARK OFFICE
CERTIFICATE OF CORRECTION

PATENT NO. : 5,178,709

DATED : January 12, 1993

INVENTOR(S) : Hisayo Shimodaira et al.

It is certified that error appears in the above-identified patent and that said Letters Patent is hereby corrected as shown below:

On the title page, Item [60],

The Related U.S. Application Data is incorrect, should read as follows: --Continuation of Ser. No. 536,313, Jun. 7, 1990, abandoned, which is a division of Ser. No. 313,317, Feb. 21, 1989, abandoned, which is a continuation of Ser. No. 153,479, Feb. 2, 1988, abandoned, which is a continuation of Ser. No. 852,292, Apr. 15, 1986, abandoned.--

Signed and Sealed this

Twenty-first Day of December, 1993

Attest:

BRUCE LEHMAN

*Attesting Officer*  *Commissioner of Patents and Trademarks*